(12) United States Patent
Shemer et al.

(10) Patent No.: US 7,239,995 B2
(45) Date of Patent: Jul. 3, 2007

(54) MULTI-STAGE PRODUCTION

(75) Inventors: Anat Shemer, Binyamina (IL); Alex Reicher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 10/443,406

(22) Filed: May 21, 2003

(65) Prior Publication Data
US 2004/0236558 A1 Nov. 25, 2004

(51) Int. Cl.
*G06F 17/50* (2006.01)
(52) U.S. Cl. .......................... 703/17; 700/108
(58) Field of Classification Search .................. 703/17, 703/108; 700/108
See application file for complete search history.

(56) References Cited

U.S. PATENT DOCUMENTS

| | | | |
|---|---|---|---|
| 6,078,900 A * | 6/2000 | Ettl et al. ..................... 705/28 |
| 6,584,370 B2 * | 6/2003 | Denton et al. ............... 700/107 |
| 6,671,568 B2 * | 12/2003 | Gerken et al. ............... 700/100 |
| 6,701,201 B2 * | 3/2004 | Hegde et al. ................ 700/107 |
| 2004/0030428 A1 * | 2/2004 | Crampton et al. .......... 700/101 |

OTHER PUBLICATIONS

Implementation of simulation-based control architecture for supply chain interactions (by Ramakrishnan et al. (2002 winter simulation Conference)).*
Simulation-Based approach to design a Multi-stage flow-shop in steel works by Ueno et al. (IEEE 1991).*
B. Fields, et al. "Focusing Processor Policies via Critical-Path Prediction", 2001, Computer Architecture, 2001, pp. 74-85.

\* cited by examiner

*Primary Examiner*—Paul Rodriguez
*Assistant Examiner*—Andre Pierre-Louis
(74) *Attorney, Agent, or Firm*—Fish & Richardson P.C.

(57) ABSTRACT

A method includes simulating a token through a production process, the production process having a plurality of stages, determining whether the token may proceed from a first stage to a second stage in the production process, detecting event information as the token proceeds through the plurality of stages, and determining a root cause of a detected stall event based on the event information.

26 Claims, 3 Drawing Sheets

MULTI-STAGE PRODUCTION

BACKGROUND

Multi-stage production refers to a process of completing a product (a unit) by performing a series of actions on the unit in multiple, separate stages. Several units may be processed in a pipelined fashion, e.g., processing a first unit through consecutive stages and as the first unit completes processing in each stage, immediately processing a subsequent unit in the completed stage. Any delay in the production of the first unit may cause a delay (a "stall") in the production of subsequent unit(s). Stall(s) in the production process increases the overall production time of units, which is undesirable.

One particular type of multi-stage production design is a computer processor having a pipeline for processing multiple instructions. To improve the performance of a multi-stage pipelined processor a model may be developed to simulate the behavior of the processor while executing a set of instructions.

DESCRIPTION

Figure 1:
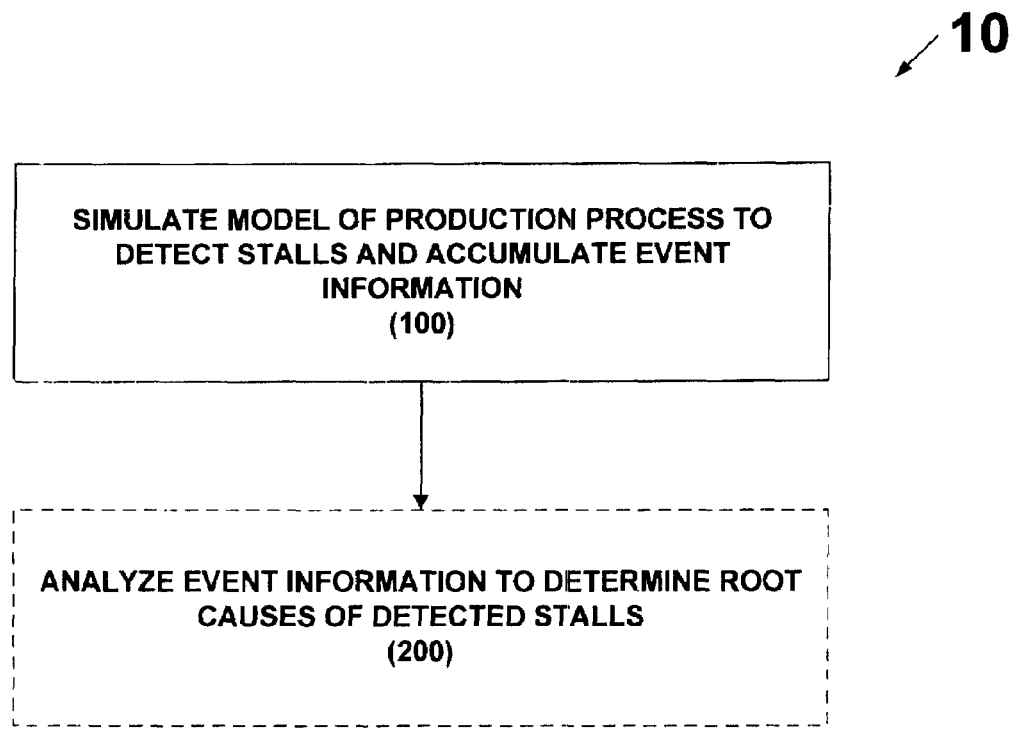
FIG. 1 is a flowchart of a process for detecting events in a simulation model.

FIG. 1 depicts a process 10 that may be performed to detect stalls and accumulate corresponding stall information based upon a simulated model of a multi-stage production process. Stall information refers to information that may be used to identify, for example, a stage of production affected by the detected stall, a condition or resource that caused the detected stall, and/or a time period of the detected stall. A user of process 10 may use the accumulated stall information to determine a cause of a detected stall(s). Determining the cause of a detected stall allows the user to make modifications to the production process to improve the speed of the process. Conventional model(s) are generally limited to providing quantitative information on detected delays, e.g., they may not model or determine the affect of a stall at one stage upon another stage(s) in the production process being modeled.

Process 10 includes a first process 100, that may be used to detect events (e.g., stall events) and accumulate stall information during the simulation of a model of a multi-stage production process. Process 10 may also include an optional analysis process 200 that may be performed to analyze event information accumulated during the performance of process 100. As will be explained in greater detail, optional process 200 includes determining a root cause(s) of each detected stall(s), e.g., determining the most likely cause of each detected delay in the model that may affect and/or cause other stall(s) in the production process.

In one embodiment, process 100 is based upon the following set of three (3) conditions, a1, b1 and c1, which are used to determine when a unit of production progresses from one stage to the next in a multi-stage process:

Condition a1: Unit processing in the current stage has finished.

Condition b1: The next stage has enough free capacity to handle additional unit processing.

Condition c1: All required signals from other units at other stages have arrived. For example, if the production process requires processing units consecutively, a unit may move to the next stage only after it receives a signal that indicates the preceding unit has proceeded to another stage in the production process.

At any time, t, during the simulation of a production process model, each condition a1-c1 has either a true or false state. For example, a current unit of production is considered stalled when condition a1 is true, and either condition b1 or c1 is false. Condition b1 will remain false for the current unit as long as a previous unit(s) is using all the capacity of the next required stage. Condition c1 remains false until all required signal(s) are received, indicating the current unit may proceed. A stall, once started, continues until all conditions, a1-c1, are true.

In an embodiment, process 100 models a production process by simulating a token (a unit of production) that proceeds through the production process. The token may require the use of one or more resources and/or one or more signal(s) to complete the production process. Exemplary definitions of resources, signals and tokens that may be used by process 100 are:

Resources (R) used in the model: A resource has a name and a known capacity. In some cases, a resource may represent a production stage in the process 100, for example, the resource capacity may indicate a number of tokens that may be processed by a stage at the same time.

Signals (S) used in the model: Each signal has a name. Signals may refer to general signals used in the model, and/or may refer to specific signals associated with resources used in the model.

Tokens (T) used in the model: Tokens represent units of production that proceed through the production stages. A token has an identity (e.g., a name or number) and a specific period of life in the modeled production process. A token may hold one or more resources in a single stage of production, and/or hold one or more resources through multiple stages of the process.

During the modeling of a multi-stage process, determinations (or operations, for example) are made as to whether a token may proceed from one stage to the next, for example, one or more of the following determinations may be performed:

Token creation, which represents the entrance of a unit to a production process.

Token deletion, which represents a termination of a unit in the production process, for example, because the unit's processing has finished.

Query a resource, which refers to a determination as to whether the resource has un-used capacity. The query can either succeed or fail.

Acquire some, or all, of a resource's capacity. Subsequent tokens cannot use the acquired resource capacity until released.

Release resource capacity. The released resource capacity is available for use by other tokens and queries on it will succeed.

Query signal status, which refers to a determination as to whether a signal was received or detected. The query can either succeed or fail.

Process 100 includes detecting events during simulation, and accumulating (e.g., storing) corresponding event information. The following are exemplary event types that may be detected (and corresponding event information accumulated) during performance of process 100:

"Hold" events, which represent events when tokens occupy resource capacity.

"Capacity stall" events, which represent events when tokens are stalled waiting for a query for a resource to succeed. Capacity stall events correspond to a false condition a1, as described previously.

"Signal stall" events, which represent events when tokens are stalled waiting for a signal. Signal stall events correspond to a false condition b1, as described previously.

Table 1 (below) shows the types of events, with corresponding beginning and end specifiers, for exemplary events that may be detected by process 100.

TABLE 1

| Event Name | Event Meaning | Start Specifier | End Specifier | Additional condition |
|---|---|---|---|---|
| Hold | Token occupies resource capacity | Token acquires a resource | Token releases the resource | |
| Capacity Stall | Token stalls due to lack of resource capacity | Token queries a resource and the query fails | Token queries the resource and the query succeeds | The token later acquires the resource |
| Signal Stall General | Token stalls while waiting for a signal from resource | Token queries a resource and the query fails | Token queries the resource and the query succeeds | The token does not acquire later the resource |
| Signal Stall Specific | Token stalls while waiting for a specific signal status | Token queries a signal status and the query fails | Token queries the signal status and the query succeeds | |

Capacity stall events and signal stall events represent false conditions b1 and c1, respectively. Hold events represent the progress of a token (a unit) in the modeled production process. In some cases, the resource a token is holding when a stall is detected may be used to identify a stage affected by the stall.

Process 100 may be used to simulate the production of tokens through a multi-stage production process having a set of resources and/or signals. Process 100 includes determining hold and stall events that occur to each token based upon the availability of the resources and/or signals of the model. Event information recorded (e.g., stored) by process 100 may include a beginning and ending time that corresponds to an occurrence, and duration, of the detected event during simulation.

Process 100 may be implemented based on an algorithm 105, shown below. Algorithm 105 may correspond, in part, to operations described in Table 1. Algorithm 105 includes element numbers 110-140 to indicate sections of code and/or operations that will be described in greater detail below.

Process 100, based on algorithm 105, includes creating (110) a completed-event-set for the simulation of the model, defining (120) a resource name and associated capacity for each resource of the production process, and creating (125) a token-event-set for each token created for the model. The token-event-set is a temporary list of event(s) used to store events during the simulation of a particular token through the model. As each event is added to the token-event-set, a beginning time is associated with the event. As events are completed by a token, an ending time is added to the event information, and the completed event information is moved to the completed-event-set. The events stored in the completed-event-set will typically include events detected during simulation of many tokens through process 100, and the accumulated event information may be used to analyze the modeled production process.

Algorithm 105:

Create empty complete-event-set. (110)

For each resource that the model uses: define register resource name and capacity. (115)

For each signal that the model uses: define signal name. (120)

For each operation on which the model reports:

```
If operation is "Token Creation"
        Create a token with an empty event-set.      (125)
End If
If operation is "Token Deletion"
        For each complete Stall event in the token event-set
            (130)
        Mark event as Signal Stall
        Add event to the complete-event-set.
        End For
        Empty token event-set and destroy token.     (135)
End If
If Operation is "Acquire Resource Capacity":
        Create Hold(token, resource, current time) event
        where current time is Hold begin time.
        Add event to the token event-set.
        If exists a complete Stall (token, resource) event in
        the token event-set (140)
                Mark event as Capacity Stall.
                Add event to the complete-event-set.
                Remove event from token event-set.
        End If
End If
If Operation is "Release Resource Capacity":
        Find Hold(token, resource) event in token event-list.
        Mark event as complete with current time as event end
        time.
        Add event to the complete-event-set and remove it
        from token event-set.
End If
If Operation is "Query Resource"
        If Query failed
            If does not exist an incomplete Stall
            (token,resource) event in the token event-set
                    Create Stall (token, resource, current time)
                    event where current time is Stall begin time;
                    Add event to the token event-set.
            End If
        End if
        If Query succeeded
            If exists an incomplete Stall (token, resource)
            event in the token event-set
            Mark event as complete with current time as event
            end time.
            End If
        End If
End If
        If Operation is "Query Signal Status"
            If Query failed
                    Create Signal Stall (token, signal, current
                    time) event where current time is Signal Stall
                    begin time;
```

-continued

```
            Add event to the token event-set.
        End If
    End if
    If Query succeeded
        If exists an incomplete Signal Stall (token, signal)
        event in the token event-set
            Mark event as complete with current time as event
            end time.
            Add event to the complete-event-set.
            Remove event from token event-set.
        End If
    End If
End If
End For
```

Upon completion of process 100, based on algorithm 105, the complete event set (110) will contain detected hold and stall events. The detected event information may include a representation of resources with name and capacity (115) and signals with names (120). Algorithm 105 may also include reporting token creation in a token-event-set (125). The token-event-set may include incomplete events, for example, including an event from the time the first operation causes event creation until the time an operation causes event completion. Events that remain incomplete when token deletion is reported are discarded (135).

Capacity stalls and/or resource related signal stalls may be caused when a query failure occurs and may end when a query success occurs. However capacity stalls may occur if the stalling token subsequently acquires the queried resource (140). In one implementation, a resource related signal stalls occurs only if the stalling token never acquires a queried resource, which is detected only when the token is deleted (130).

Figure 2:
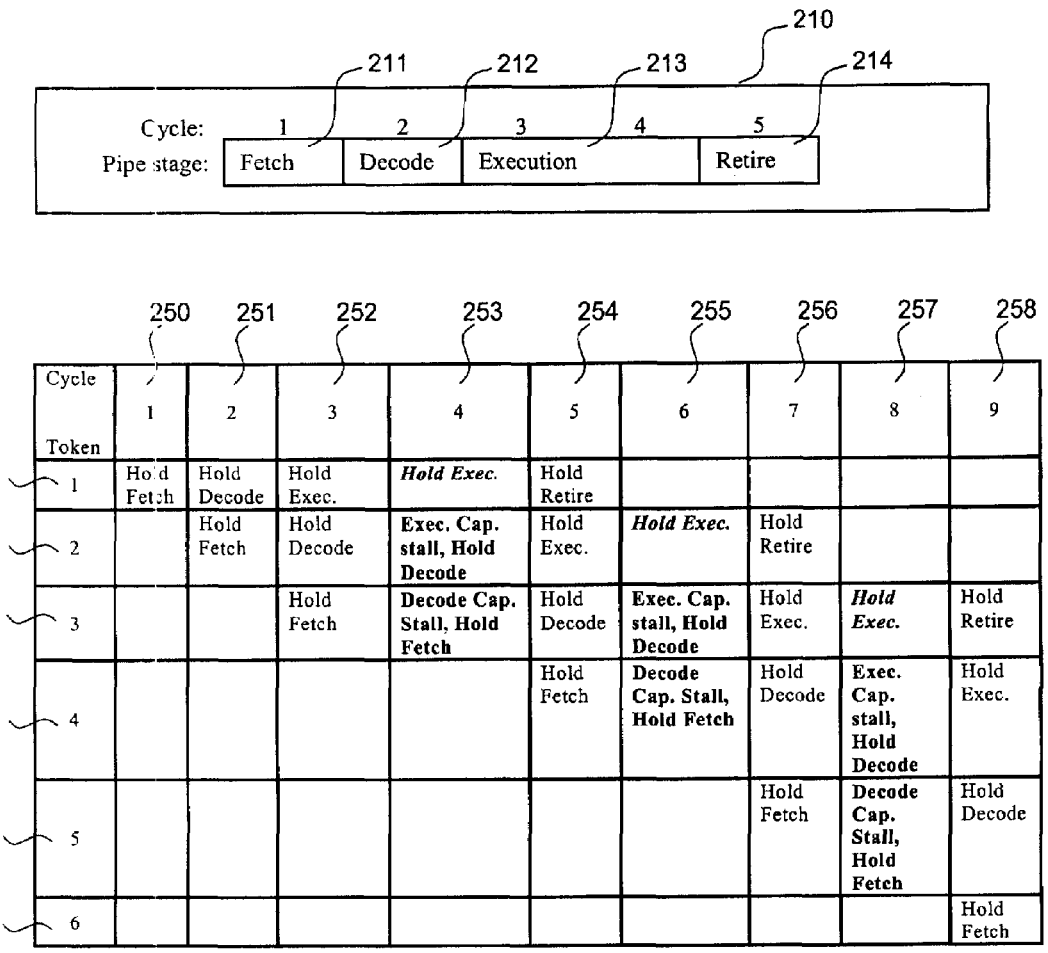
FIG. 2 depicts detected events from a simulated model of a pipelined computer processor.

FIG. 2 depicts an example of detected events based upon the performance of process 100 on a model of a multi-stage computer processor. This example uses a model based upon a processor having a pipeline 210 that includes four stages: fetch 211, decode 212, execute 213, and retire 214. In this example, pipeline stage 211, 212 and 214 require a single clock cycle to complete, by contrast, execution stage 213 requires two clock cycles to complete. Each pipeline stage, 211-214, has an associated latch that can hold one instruction at a time. An objective of the processor design that includes pipeline 210 is to allow an instruction to be completed in each clock cycle of the computer processor.

In this example, process 100 uses a model of stages 211-214 of pipeline 210, with each stage being modeled as a resource with a capacity of one. Process 100 may be used to analyze operations performed on the modeled tokens and/or resources. The result of the operations performed may then be translated as detected event information. As an example, Table 220 depicts the set of events 240 that process 100 detects during the execution of six instructions (tokens), 230-235, during nine consecutive clock cycles, 250-258. The events 240 that are detected as stall events are depicted in bold lettering, for example, stall events are shown in cycles 253, 255 and 257.

Detected event information accumulated during performance of process 100 may be stored and/or presented to a user of process 100. The detected event information may be analyzed manually by the user in an attempt to determine the cause of each event in the simulation (e.g., a cause of a stall event.)

Alternatively, a process 200 (see FIG. 1) may be performed to determine a "stall root cause" from a set of event information accumulated during performance of process 100. Stall root cause refers to a condition(s) that is determined to be the cause of a stall, for example, a resource and/or signal required by a token that was not available. Determining a stall root cause condition may be implemented as a rule-based determination. A first stall root cause condition rule (Rule 1) may refer to determining that a stall condition that occurs during the processing of a first unit is caused by the production of another unit. Rule 1 may be applied to the example shown in FIG. 3, that is, during cycle 4 (253), token 2 (231) is stalled waiting for the execution resource (213), which, during cycle 4 (253) is being held by token 1 (230). In this case token 1 (230) is not stalled but the lack of execution capacity is the stall root cause of token 2 during cycle 4 (253). A second stall root cause condition rule (Rule 2) may refer to determining that a stall occurs during the processing of first unit, and determining the stall is preceded by a second unit that also stalls, then the stall root causes of the first unit may include the stall root cause of the second unit. Rule 2 may be applied to the example shown in FIG. 3, that is, during cycle 4 (253), token 3 (232) is stalled waiting for the decode resource (212) that is being held by token 2 (231). The stall root cause of token 3, therefore, is the stall of token 2, which is caused by the lack of execution capacity being held by token 1. In essence, the stall root cause of token 2 during cycle 4 propagates to token 3.

Process 200 may be based upon an algorithm 300 (presented below) that determines stall events and a related cause(s) that may be based, in part, upon Rule 1 and Rule 2, described previously. In some cases a stall event may have more than one stall root cause. Therefore, the algorithm 300 provides an example (within italics) for accumulating multiple periods for each stall root cause, where the relatively higher sum of periods signifies a relatively more significant cause. Algorithm 300 is presented below, and uses the following notations and definitions:

```
R = Resource
S = Signal          ; Signal may refer to general
                    ; signals, and/or signals
                    ; specifically related to a
                    ; resource, for example.
T = Token
b = event begin time
e = event end time
```

H (R,T,b,e)=Hold event where token T holds resource R from time b until time e.

Stall (T,b,e)=Token T is stalled from time b until time e. Stall can be mapped to either SBC or SBS event (see below).

SBC (R,b,e)=Stall By Capacity event due to lack of resource R capacity from time b until time e.

SBS (S,b,e)=Stall By Signal event due to waiting for signal S from time b until time e.

Algorithm 300, for determining a stall root cause and measuring relative significance of each determined stall root cause, is presented as follows:

```
For each resource and signal create an empty stall-period-set.
For each event H(R,T,b,e)
    Find_stall_root_cause (T,b,e).
End For
Find stall root cause (T,b,e):
    For each Stall (T,b1,e1) where [b1,e1) ⊂ [b, e)
```

```
Rule A:
    If Stall is SBS(S,b1,e1) while waiting
            for token Ta to set signal S
        Find_stall_root_cause (Ta,b1,e1)
        Add Ta stall root causes during [b1,
            e1) to T stall root cause set.
        For each period [b2,e2) ⊆ [b1,e1)
            during which Ta is not stalled
            Add SBS(S,b2,e2) to T Stall root cause
                set.
            Add [b2,e2) to signal S stall-period-
                set.
        End For
    End If
Rule B:
    If Stall is SBC (Ra,b1,e1)
        For each token Ti holding resource Ra
            during [b2,e2) ⊆ [b1,e1)
            Find_stall_root_cause (Ti,b2,e2)
            Add Ti stall root causes during
                [b2,e2) to T stall root cause set.
            For each period [b3,e3) ⊆ [b2,e2)
                during which Ti is not stalled
                Add SBC (Ra,b3,e3) to T stall
                    root cause set.
                Add [b3, e3) to resource Ra stall-
                    period-set.
            End For
        End For
    End If
End For
```

Process 200, based on algorithm 300, may be applied to a set of detected event information, for example, applied to detected information as shown in FIG. 2. In this example, according to Rule B of algorithm 300, one stall root cause may be insufficient capacity at the execution stage 213 of pipeline 210, e.g., a stall root cause related to execution capacity stall events detected during three cycles: cycle 253, 255 and 257.

Figure 3:
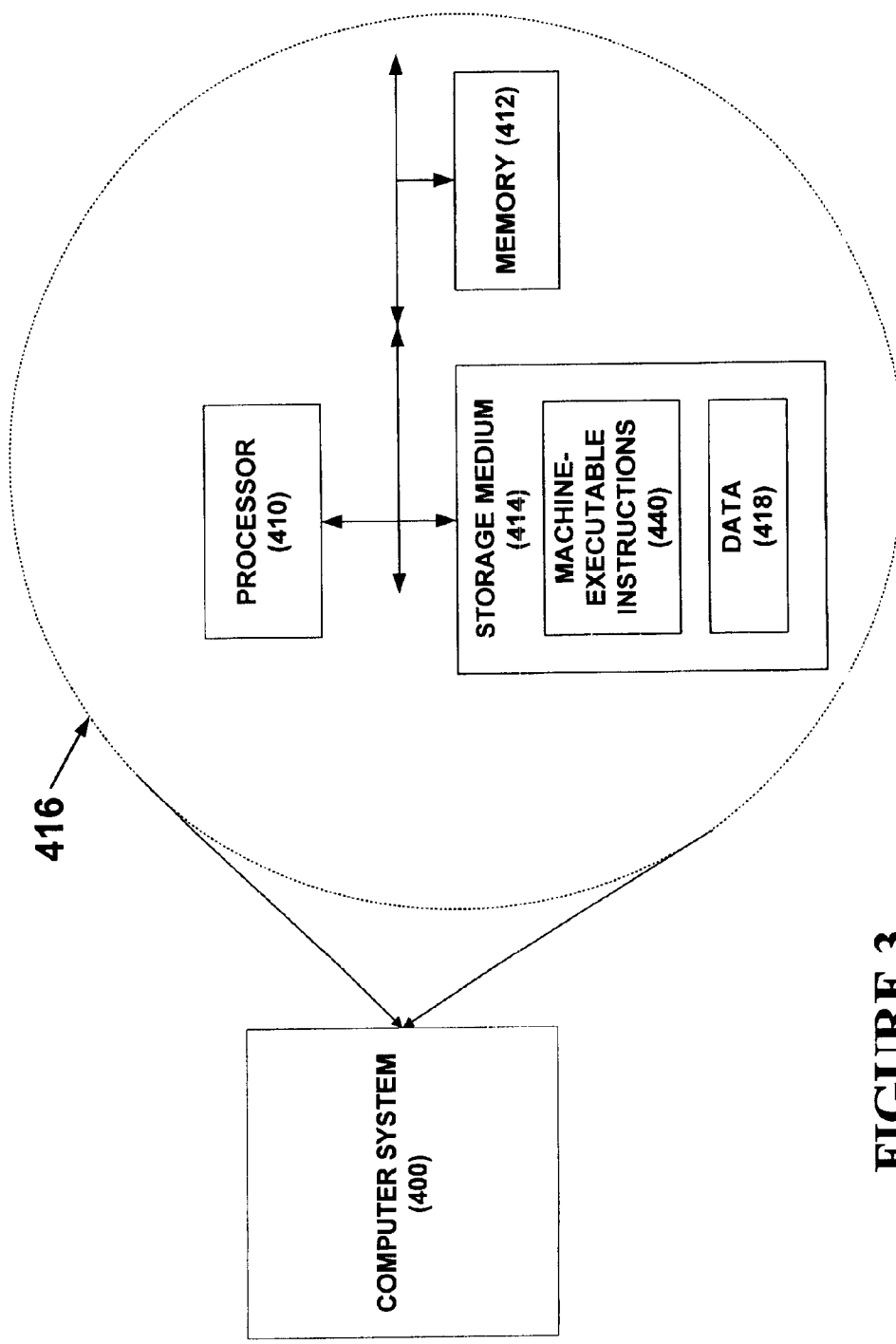
FIG. 3 is a block diagram of computer hardware on which the process corresponding to FIG. 1 may be implemented.

Referring to FIG. 3, an implementation of a computer system 400 includes a processor 410, a memory 412, and a storage medium 414 (see view 416). Storage medium 414 stores data 418 and also stores machine-executable instructions 420 that are executed by processor 410 out of memory 412 to perform functions (for example, process 100 and/or process 200). Furthermore, each user device and host computer may include an operating system.

The invention is not limited to the specific implementations described herein. For example, we discussed the use of process 100 and/or process 200 to detect events as applied to a model of a micro-processor. However, process 100 and/or process 200 are applicable to other types of multi-stage production processes. Also, we described process 100 and/or process 200 being useful for the detection of stall conditions. However, process 100 and/or process 200 may also be applicable to detecting other types of delays that occur in a production process, and is not limited to the detection of stalls in a micro-processor.

Computer systems that may be used to implement the techniques described here are not limited to the components shown in FIG. 3. These techniques may find applicability in any computing or processing environment. These techniques may be implemented in hardware, software, or a combination of the two. These techniques may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications. The disclosed techniques also may be implemented as a machine-readable storage medium, configured with a computer program, where, upon execution, instructions in the computer program cause a machine to operate in accordance with those applications.

The system and/or processes described here, or certain aspects or portions thereof, may take the form of program code (e.g., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the system and/or processes described here. The system and/or processes described here may also be embodied in the form of program code that is transmitted over some transmission medium, such as over electrical wiring or cabling, through fiber optics, or via any other form of transmission (such as an electronic connection), wherein, when the program code is received and loaded into and executed by a machine, such as a computer, the machine becomes an apparatus for practicing the system and/or processes described here. When implemented on a general-purpose processor, the program code combines with the processor to provide a unique apparatus that operates analogously to specific logic circuits.

Other embodiments not described herein are also within the scope of the following claims.

What is claimed is:

1. A method comprising:
    simulating a first token proceeding through a data processor, the data processor having a plurality of stages, wherein the first token represents a collection of data and the simulation includes
        creating the first token,
        creating a first hold event to represent an acquisition of a first capacity of a first resource by the first token,
        creating a first capacity stall event to represent that a second resource lacks capacity to fulfill a request for capacity for the first token,
        creating a first signal stall event to represent that a processing of the first token is stalled waiting for a first signal, and
        collecting an event set that includes the first hold event, the first capacity stall event, and the first signal stall event;
    determining a root cause of at least one of the first capacity stall event and the first signal stall event based on the event information set and providing information describing the root cause to a user for use in improving the performance of the data processor.

2. The method of claim 1, wherein said simulating comprises performing an operation on the first token.

3. The method of claim 1, wherein said simulating further comprises determining that an operation requires a resource.

4. The method of claim 3, wherein said determining that the operation requires the resource further comprises:
    determining that the operation comprises a release resource operation; and
    releasing the resource.

5. The method of claim 3, wherein said determining that the operation requires the resource further comprises:
  determining that the operation comprises an acquire resource operation; and
  acquiring capacity of the resource for the first token.

6. The method of claim 1, wherein said determining the root cause further comprises determining that the first capacity stall event was caused by processing of a second token.

7. The method of claim 1, further comprising:
  storing the event set in response to the first token proceeding from the first stage to the second stage.

8. The method of claim 1, further comprising storing at least one of a beginning time, an ending time, and a stage in association with the first capacity stall event.

9. An article comprising one or more machine-readable media including machine-executable instructions operative to a cause one or more machines to perform operations, the operations comprising:
  simulating a first token proceeding through a data processor, the data processor having a plurality of stages, wherein the first token represents a collection of data and the simulation operations include
  creating the first token,
  creating a first hold event to represent an acquisition of a first capacity of a first resource by the first token,
  creating a first capacity stall event to represent that a second resource lacks capacity to fulfill a request for capacity for the first token,
  creating a first signal stall event to represent that a processing of the first token is stalled waiting for a first signal, and
  collecting an event set that includes the first hold event, the first capacity stall event, and the first signal stall event;
  determining a root cause of at least one of the first capacity stall event and the first signal stall event based on the event set; and providing information describing the root cause to a user for use in improving the performance of the data processor.

10. The article of claim 9, wherein said simulation operations further comprise performing an operation on the first token.

11. The article of claim 10, wherein said simulation operations further comprise determining that an operation requires a resource.

12. The article of claim 11, wherein said simulation operations further comprise:
  determining that the operation comprises a release resource operation; and
  releasing the resource.

13. The article of claim 11, wherein said simulation operations further comprise:
  determining that the operation comprises an acquire resource operation; and
  acquiring capacity of the resource for the first token.

14. The article of claim 9, wherein said operations further comprise determining that the first capacity stall event was caused by processing of a second token.

15. The article of claim 9, wherein the operations further comprise:
  storing the event set in response to the first token proceeding from the first stage to the second stage.

16. The article of claim 9, wherein said operations further comprise storing at least one of a beginning time, an ending time, and a stage in association with the first capacity stall event.

17. The method of claim 1, wherein the data processor is defined before the simulation.

18. The article of claim 14, wherein the data processor is defined before the simulation.

19. The method of claim 1, further comprising:
  creating a collection of tokens;
  repeating the creation of a hold event, the creation of a capacity stall event, and the creation of a signal stall event for each of the tokens in the collection; and
  collecting an event set that includes the hold events, the capacity stall events, and the signal stall events for each of the tokens.

20. The method of claim 1, further comprising marking the first hold event as complete to represent a release of the first capacity of the first resource by the first token.

21. The method of claim 1, wherein:
  creating the first hold event comprises associating a name of the first resource with the first token;
  creating the first capacity stall event comprises associating a name of the second resource with the first token; and
  creating the first signal stall event comprises associating a name of a first signal with the first token.

22. The method of claim 21, wherein creating the first hold event, creating the first capacity stall event, and creating the first signal stall event each comprises associating a timing of an event with the first token.

23. The article of claim 9, wherein the simulation operations further comprise:
  creating a collection of tokens;
  repeating the creation of a hold event, the creation of a capacity stall event, and the creation of a signal stall event for each of the tokens in the collection; and
  collecting an event set that includes the hold events, the capacity stall events, and the signal stall events for each of the tokens.

24. The article of claim 9, wherein said simulation operations further comprise marking the first hold event as complete to represent a release of the first capacity of the first resource by the first token.

25. The article of claim 9, wherein:
  creating the first hold event comprises associating a name of the first resource with the first token;
  creating the first capacity stall event comprises associating a name of the second resource with the first token; and
  creating the first signal stall event comprises associating a name of the first signal with the first token.

26. The article of claim 9, wherein creating the first hold event, creating the first capacity stall event, and creating the first signal stall event each comprises associating a timing of an event with the first token.

* * * * *